Patented Feb. 16, 1926.

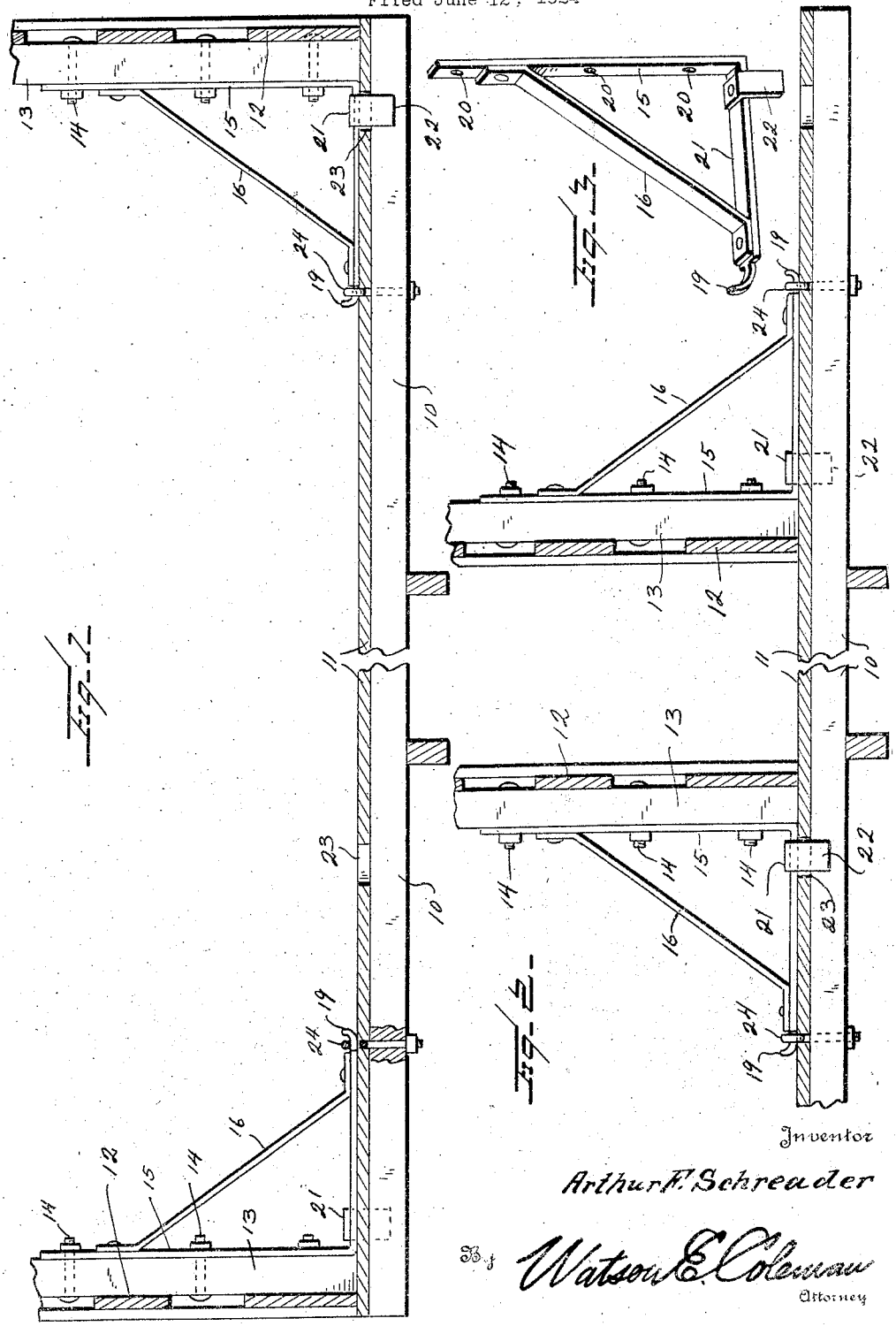

1,573,750

UNITED STATES PATENT OFFICE.

ARTHUR F. SCHREADER, OF FLANDREAU, SOUTH DAKOTA.

COMBINED HAYRACK AND HOGRACK.

Application filed June 12, 1924. Serial No. 719,591.

*To all whom it may concern:*

Be it known that I, ARTHUR F. SCHREADER, a citizen of the United States, residing at Flandreau, in the county of Moody and State of South Dakota, have invented certain new and useful Improvements in Combined Hayracks and Hogracks, of which the following is a specification, reference being had to the accompanying drawings.

This invention relates to means for converting a hay rack into a hog rack, and particularly to the brackets whereby the sides of the "basket" or hay rack are mounted upon the bed or bottom of the wagon, and means whereby this bracket is connected to the bottom of the wagon, the means being such as to permit the sides supported by the brackets to be shifted either inward so as to form the sides of a hog rack or shifted outward so as to form the sides of a hay basket or rack.

A further object is to provide a bracket of this character which is very simple, which may be readily applied, which is very cheaply made, and which I have found to be particularly effective in actual practice.

My invention is illustrated in the accompanying drawings, wherein:

Figure 1 is a transverse sectional view through a wagon body showing my brackets arranged to provide a hay rack;

Figure 2 is a like view to Figure 1, but showing the brackets arranged to provide a hog rack;

Figure 3 is a perspective view of the bracket detached.

Referring to these drawings, it will be seen that 10 designates the transverse beams of the body of a hay wagon, and 11 designates the boards forming the bottom thereof. The sides 12 of the hay rack may be formed in any suitable manner but, as illustrated, the sides are mounted upon vertical members 13 having inwardly extending bolts 14.

The bracket consists of the angularly bent strap iron 15 and the diagonally extending brace 16 also made of strap iron. This brace is riveted at its ends to the angular strip 15. That end of the base of the bracket which is remote from the vertically extending portion thereof is formed with a curved tongue 19. The vertically extending portion of the strip 15 is formed with bolt holes 20 through which the bolts 14 are adapted to pass, and the base of the strip adjacent the vertically extending portion thereof has riveted to it a downwardly extending L-shaped lug 22.

The floor 11 of the hay rack immediately adjacent one of the beams 10 is provided with a slot 23 through which this lug 22 is adapted to be inserted. Passing through the beam 10 is an eye-bolt 24, the eye of which extends slightly above the floor 11 and is adapted for engagement by the tongue 19.

In the use of this construction as a bracket for hay racks or to transform the body of the vehicle into a hay rack, the brackets are disposed with their vertical portions outward at the extreme outer margin or edge of the floor 11 and the walls 12 are, of course, bolted to this bracket and supported in a vertical position. When, however, it is desired to use this device as a hog rack, the brackets and walls which were disposed at the left end of the body are shifted over to the right and the brackets and wall which were disposed on the right are shifted to the left, as illustrated in Figure 2, and the tongues 19 of the several brackets engaged with the several eye-bolts 24. This results in the walls 12 being brought relatively close together so as to form a hog rack. Preferably the walls 12 are not solid but are formed of longitudinally extending slats. The floor 11, however, is preferably tight. Eight brackets will ordinarily be used to make the rack complete.

Obviously, I do not wish to be limited to the exact details of construction. It will be seen that a bracket of this character is very readily put in place and removed so that the walls 12 may be readily attached to the wagon body or removed therefrom and as readily shifted either into position to form a hog rack or a hay rack, as desired.

I claim:—

1. In a hay rack having a floor, of upright walls for the hay rack, brackets detachably holding said walls to the floor, each of said brackets comprising an angularly bent iron to provide an upright portion and a horizontal portion, the horizontal and upright portions being connected by a diagonal brace, walls to which the vertical portions of the irons are connected and eye-bolts passing through the floor of the hay rack body, said floor being formed with slots adjacent the ends and inward of the ends, the horizontal portion of each bracket being formed adjacent the upright portion with a downwardly extending lug adapted to pass through said slots and at the extremity of the horizontal portion with an upwardly curved tongue adapted to engage in the eye of the corresponding eye-bolt.

2. A device of the character described comprising a horizontal member, a vertical member associated therewith, the former being provided with an opening in close proximity to the vertical member, an L-shaped bracket having its legs positioned against the horizontal and vertical members, fastenings securing the vertical leg to the vertical member, a lug carried by the horizontal leg of the L-shaped member and extending at right angles thereto and accommodated in the opening, an angular brace connecting the two legs, an upwardly directed hook element formed upon the inner extremity of the horizontal leg, an eye-bolt having its shank passing through the horizontal member and engaged with the horizontal leg at a point rearwardly of and in close proximity to the hook element.

In testimony whereof I hereunto affix my signature.

ARTHUR F. SCHREADER.